(12) United States Patent (10) Patent No.: US 9,124,304 B2
Hillan (45) Date of Patent: Sep. 1, 2015

(54) METHODS AND APPARATUS FOR REDUCING OVERHEAD FOR NFC DATA EXCHANGE PROTOCOL MESSAGES

(71) Applicant: QUALCOMM Incorporated, San Diego, CA (US)

(72) Inventor: John Hillan, Farnborough (GB)

(73) Assignee: QUALCOMM Incorporated, San Diego, CA (US)

(*) Notice: Subject to any disclaimer, the term of this patent is extended or adjusted under 35 U.S.C. 154(b) by 164 days.

(21) Appl. No.: 13/765,344

(22) Filed: Feb. 12, 2013

(65) Prior Publication Data

US 2014/0106671 A1 Apr. 17, 2014

Related U.S. Application Data

(60) Provisional application No. 61/714,939, filed on Oct. 17, 2012.

(51) Int. Cl.
*H04B 5/00* (2006.01)
*H04J 3/16* (2006.01)
(Continued)

(52) U.S. Cl.
CPC ............... *H04B 5/0031* (2013.01); *H04B 5/02* (2013.01); *H04L 69/22* (2013.01); *H04W 4/008* (2013.01)

(58) Field of Classification Search
CPC .. H04B 5/02; H04B 5/0031; H04L 29/06102; H04L 2012/5652; H04L 69/22
USPC ................ 455/41.1–41.3, 558; 470/471, 474
See application file for complete search history.

(56) References Cited

U.S. PATENT DOCUMENTS

| 7,365,642 B2 | 4/2008 | Tabayashi et al. |
| 7,948,925 B2 | 5/2011 | Miyabayashi et al. |

(Continued)

FOREIGN PATENT DOCUMENTS

| CN | 101527911 A | 9/2009 |
| CN | 102090007 A | 6/2011 |
| WO | WO-2012057501 A1 | 5/2012 |

OTHER PUBLICATIONS

"Simple NDEF Exchange Protocol—Technical Specification, SNEP 1.0", Aug. 31, 2011, pp. 1-20, XP055081363, Wakefield, MA, USA, 01880, Retrieved from the Internet: URL:http://www.jortec.neec-fct. org/wp-content/uploads/2013/02/Simple_NDEF_Exchange_Protocol.pdf [retrieved on Sep. 27, 2013] section 2.1.

(Continued)

*Primary Examiner* — Simon Nguyen
(74) *Attorney, Agent, or Firm* — Charles E. Eggers (57) ABSTRACT

A method, an apparatus, and a computer program product for wireless communication are provided in connection with improving NDEF message processing. In one example, a communications device is equipped to determine, based on one or more contextual factors, that data received at a NFC device is missing at least a portion of a NDEF header, and generate a complete NDEF message by adding the missing portion of the NDEF header. In another example, a communications device is equipped to receive a complete NDEF message that includes a NDEF header and data and is intended to be written on a remote NFC device, determine, based on one or more contextual factors, that the remote NFC device is configured to receive a modified version of the complete NDEF message, and generate the modified version of the complete NDEF message by removing at least a portion of the NDEF header.

23 Claims, 8 Drawing Sheets

(51) Int. Cl.
*H04J 3/22* (2006.01)
*H04J 3/24* (2006.01)
*H04W 4/00* (2009.01)
*H04L 29/06* (2006.01)
*H04B 5/02* (2006.01)

(56) References Cited

U.S. PATENT DOCUMENTS

| | | | |
|---|---|---|---|
| 8,255,469 B2 | 8/2012 | Leppanen et al. | |
| 2009/0196309 A1 | 8/2009 | Fujinaga et al. | |
| 2010/0017570 A1 | 1/2010 | Gallo et al. | |
| 2012/0207305 A1* | 8/2012 | Gallo et al. | 380/271 |
| 2012/0320763 A1 | 12/2012 | Hong et al. | 370/246 |
| 2013/0095757 A1* | 4/2013 | Abdelsamie et al. | 455/41.1 |
| 2013/0309971 A1* | 11/2013 | Kiukkonen et al. | 455/41.2 |
| 2013/0311313 A1* | 11/2013 | Laracey | 705/16 |
| 2013/0344804 A1* | 12/2013 | Chen et al. | 455/41.1 |
| 2014/0045426 A1* | 2/2014 | Cho | 455/41.1 |
| 2014/0120834 A1* | 5/2014 | Gormley et al. | 455/41.1 |
| 2014/0208121 A1* | 7/2014 | Arunan et al. | 713/176 |
| 2014/0213183 A1* | 7/2014 | Reddy Badvel et al. | 455/41.1 |
| 2014/0220890 A1* | 8/2014 | Bukovjan et al. | 455/41.1 |
| 2014/0357187 A1* | 12/2014 | Ehrensvärd | 455/41.1 |

OTHER PUBLICATIONS

International Search Report and Written Opinion—PCT/US2013/064326—ISA/EPO—Apr. 10, 2014.
NFC Forum, "NFC Data Exchange Format (NDEF)—NDEF 1.0", Internet Citation, Jul. 24, 2006, XP002413994, pp. 1-21, Retrieved from the Internet: URL:http://www.nfc-forum.org/specs/spec_license/downlOad_spec/0f5678c114d295e2da0d902f4e7839846281fc44/NFCForum-TS-NDEF_1.0.pdf [retrieved on Jan. 10, 2007] section 3.2.
NFC Forum TM, "NFC Record Type Definiton (RTD)", NFC Forum TM, vol. RTD 1.0, Jul. 24, 2006, pp. 1-16, XP055053929, NFC ForumTM section 2.1.
Want, R., "Near Field Communication", IEEE Pervasive Computing, IEEE Service Center, Los Alamitos, CA, US, vol. 10, No. 3, Mar. 2011, pp. 4-7, XP011336209, ISSN: 1536-1268, DOI: 10.1109/MPRV.201155 section "Record Type Definitions".
Taiwan Search Report—TW102137534—TIPO—Apr. 15, 2015.

* cited by examiner

METHODS AND APPARATUS FOR REDUCING OVERHEAD FOR NFC DATA EXCHANGE PROTOCOL MESSAGES

CLAIM OF PRIORITY UNDER 35 U.S.C. §119

The present Application for Patent claims priority to Provisional Application No. 61/714,939 entitled "METHODS AND APPARATUS FOR REDUCING OVERHEAD FOR NFC DATA EXCHANGE PROTOCOL MESSAGES" filed Oct. 17, 2012, and assigned to the assignee hereof and hereby expressly incorporated by reference herein.

BACKGROUND

The disclosed aspects relate generally to communications between and/or within devices and specifically to methods and systems for reducing the overhead of near field communication (NFC) Forum NFC data exchange protocol (NDEF) messages when stored on and/or written to a remote NFC device (e.g., Tag, reader, etc.).

Advances in technology have resulted in smaller and more powerful personal computing devices. For example, there currently exist a variety of portable personal computing devices, including wireless computing devices, such as portable wireless telephones, personal digital assistants (PDAs) and paging devices that are each small, lightweight, and can be easily carried by users. More specifically, the portable wireless telephones, for example, further include cellular telephones that communicate voice and data packets over wireless networks. Many such cellular telephones are being manufactured with relatively large increases in computing capabilities, and as such, are becoming tantamount to small personal computers and hand-held PDAs. Further, such devices are being manufactured to enable communications using a variety of frequencies and applicable coverage areas, such as cellular communications, wireless local area network (WLAN) communications, near field communication (NFC), etc.

The current NFC Forum specification defines a data format (NDEF) for use during storage and retrieval of data from remote NFC devices (e.g., tags, peer devices, etc.). NDEF is currently the only NFC Forum defined way by which an NFC Forum Device can interact with other NFC devices and/or tags. As part of these interactions, a NDEF header is used. Although relatively small, the NDEF header does add overhead to the data being stored. With small/cheap tags the overhead can become a significant factor. The smaller the amount of storage available on a tag, the bigger the percentage of said storage is used for overhead. For a 64 byte tag, even a 3 byte NDEF header accounts for 5 percent of the tag storage usage. Further, for a 16 byte tag a 3 byte NDEF header accounts for approximately 20% of the tag storage usage. A smaller memory may generally use less power, and allow for faster access times, longer read/write ranges, etc.

Thus, improved apparatus and methods for reducing overhead of NDEF messages may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with improving NDEF message processing. In one example, a communications device is equipped to determine, based on one or more contextual factors, that data received at a NFC device is missing at least a portion of a NDEF header, and generate a complete NDEF message by adding the at least the portion of the NDEF header that is missing to the data. In another example, a communications device is equipped to receive, from a writer application, a complete NDEF message that includes a NDEF header and data and is intended to be written on a remote NFC device, determine, based on one or more contextual factors, that the remote NFC device is configured to receive a modified version of the complete NDEF message, and generate the modified version of the complete NDEF message by removing at least a portion of the NDEF header from the complete NDEF message.

According to related aspects, a method for reducing overhead of NDEF messages is provided. The method can include determining, based on one or more contextual factors, that data received at a NFC device is missing at least a portion of a NDEF header. Moreover, the method may include generating a complete NDEF message by adding the at least the portion of the NDEF header that is missing to the data.

Another aspect relates to a communications apparatus enabled to reduce overhead of NDEF messages. The communications apparatus can include means for determining, based on one or more contextual factors, that data received at a NFC device is missing at least a portion of a NDEF header. Moreover, the communications apparatus can include means for generating a complete NDEF message by adding the at least the portion of the NDEF header that is missing to the data.

Another aspect relates to a communications apparatus. The apparatus can include a transceiver configured to receive data, a memory, a NFC technology detection module coupled to at least one of the memory or the processor and configured to determine, based on one or more contextual factors, that the data received at a NFC device is missing at least a portion of a NDEF header, and generate a complete NDEF message by adding the at least the portion of the NDEF header that is missing to the data.

Still another aspect relates to a computer program product, which can have a computer-readable medium including code for determining, based on one or more contextual factors, that data received at a NFC device is missing at least a portion of a NDEF header. Moreover, the computer-readable medium can include code for generating a complete NDEF message by adding the at least the portion of the NDEF header that is missing to the data.

According to another related aspect, a method for improving NDEF message processing is provided. The method can include receiving, from a writer application, a complete NDEF message that includes a NDEF header and data and is intended to be written on a remote NFC device. Further, the method can include determining, based on one or more contextual factors, that the remote NFC device is configured to receive a modified version of the complete NDEF message. Moreover, the method may include generating the modified version of the complete NDEF message by removing at least a portion of the NDEF header from the complete NDEF message.

Another aspect relates to a communications apparatus enabled to improve NDEF message processing. The communications apparatus can include means for receiving, from a writer application, a complete NDEF message that includes a NDEF header and data and is intended to be written on a remote NFC device. Further, the communications apparatus can include means for determining, based on one or more contextual factors, that the remote NFC device is configured to receive a modified version of the complete NDEF message. Moreover, the communications apparatus can include means for generating the modified version of the complete NDEF message by removing at least a portion of the NDEF header from the complete NDEF message.

Another aspect relates to a communications apparatus. The apparatus can include a transceiver, a memory, a processor coupled to the memory, and a NFC technology detection module coupled to at least one of the memory or the processor and configured to receive, from a writer application, a complete near field communication (NFC) data exchange format (NDEF) message that includes a NDEF header and data and is intended to be written on a remote NFC device, determine, based on one or more contextual factors, that the remote NFC device is configured to receive a modified version of the complete NDEF message, and generate the modified version of the complete NDEF message by removing at least a portion of the NDEF header from the complete NDEF message.

Still another aspect relates to a computer program product, which can have a computer-readable medium including code for receiving, from a writer application, a complete NDEF message that includes a NDEF header and data and is intended to be written on a remote NFC device. Further, the computer-readable medium may include code for determining, based on one or more contextual factors, that the remote NFC device is configured to receive a modified version of the complete NDEF message. Moreover, the computer-readable medium can include code for generating the modified version of the complete NDEF message by removing at least a portion of the NDEF header from the complete NDEF message.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

Generally, when communicating with a remote NFC device (e.g., tag, reader, etc.), context information may be used to infer the type of remote NFC device that is present. For example, the contextual information may include, but is not limited to location information, time or date information, RF Technology used during communications, a bit rate, an amount of data available to be communicated, analysis of a portion of the data, user interactions, etc. Accordingly, where information may be inferred about the remote NFC device, it may also be possible to omit the NDEF header from the data that is actually stored on the remote NFC device, thereby reducing overhead memory requirements on the remote NFC device. In an operational aspect, an application (e.g., reader/writer application) may still write a complete NDEF message. Thereafter, a lower layer module which, based on inferred attributes of the remote NFC device, understands the nature of the remote NFC device (e.g., tag) and/or the data may remove the NDEF header before writing. In another operational aspect, a lower layer module may add the NDEF header to the data read from a remote NFC device (e.g., tag) that has been determined to include data in a modified format (e.g., without at least a portion of the NDEF header). In such an aspect, an application may receive a complete NDEF message from the lower layer module.

Figure 1:
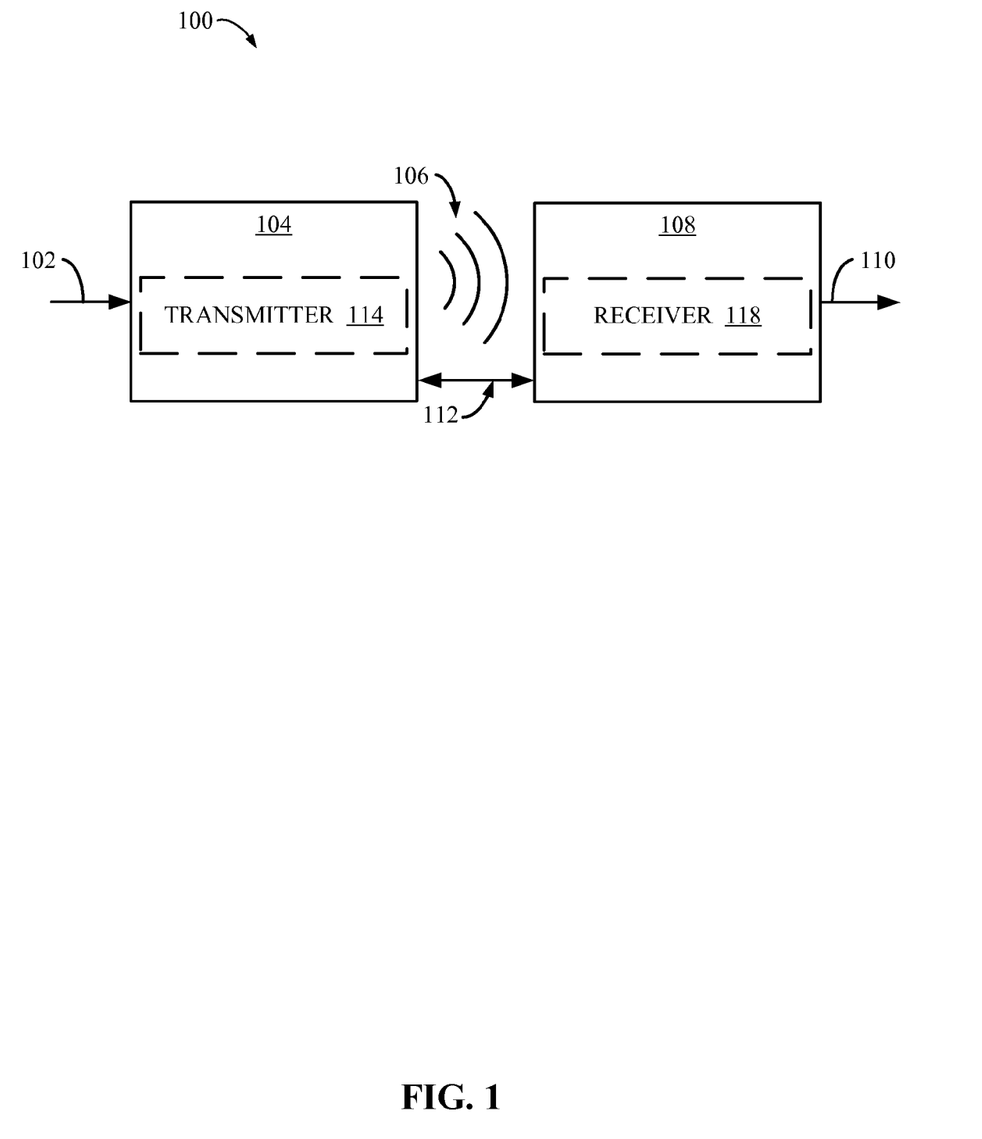
FIG. 1 is a block diagram of a wireless communication system, according to an aspect.

FIG. 1 illustrates a wireless communication system 100, in accordance with various exemplary embodiments of the present invention. Input power 102 is provided to a transmitter 104 for generating a radiated field 106 for providing energy transfer. A receiver 108 couples to the radiated field 106 and generates an output power 110 for storing or consumption by a device (not shown) coupled to the output power 110. Both the transmitter 104 and the receiver 108 are separated by a distance 112. In one exemplary embodiment, transmitter 104 and receiver 108 are configured according to a mutual resonant relationship and when the resonant frequency of receiver 108 and the resonant frequency of transmitter 104 are very close, transmission losses between the transmitter 104 and the receiver 108 are minimal when the receiver 108 is located in the "near-field" of the radiated field 106.

Transmitter 104 further includes a transmit antenna 114 for providing a means for energy transmission and receiver 108 further includes a receive antenna 118 for providing a means for energy reception. The transmit and receive antennas are sized according to applications and devices to be associated therewith. As stated, an efficient energy transfer occurs by coupling a large portion of the energy in the near-field of the transmitting antenna to a receiving antenna rather than propagating most of the energy in an electromagnetic wave to the far field. When in this near-field a coupling mode may be developed between the transmit antenna 114 and the receive antenna 118. The area around the antennas 114 and 118 where this near-field coupling may occur is referred to herein as a coupling-mode region.

Figure 2:
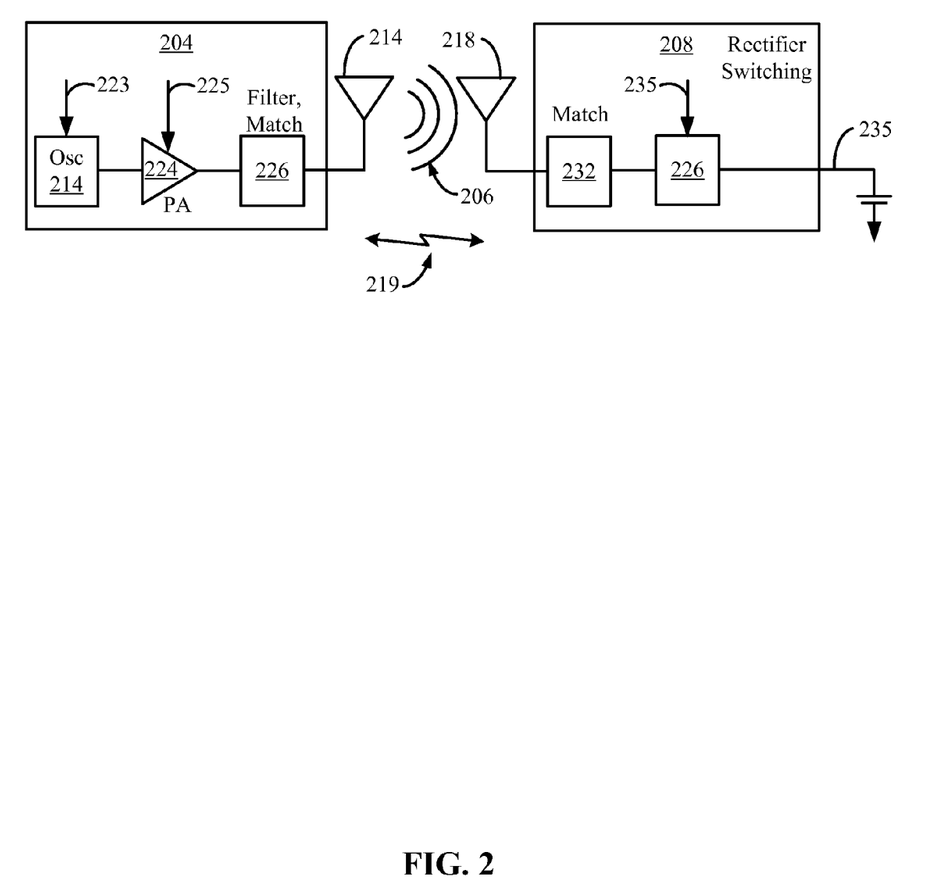
FIG. 2 is a schematic diagram of a wireless communication system, according to an aspect.

FIG. 2 shows a simplified schematic diagram of a near field wireless communication system. The transmitter 204 includes an oscillator 222, a power amplifier 224 and a filter and matching circuit 226. The oscillator is configured to generate a signal at a desired frequency, which may be adjusted in response to adjustment signal 223. The oscillator signal may be amplified by the power amplifier 224 with an amplification amount responsive to control signal 225. The filter and matching circuit 226 may be included to filter out harmonics or other unwanted frequencies and match the impedance of the transmitter 204 to the transmit antenna 214.

The receiver 208 may include a matching circuit 232 and a rectifier and switching circuit 234 to generate a DC power output to charge a battery 236 as shown in FIG. 2 or power a device coupled to the receiver (not shown). The matching circuit 232 may be included to match the impedance of the receiver 208 to the receive antenna 218. The receiver 208 and transmitter 204 may communicate on a separate communication channel 219 (e.g., Bluetooth, Zigbee, cellular, etc).

Figure 3:
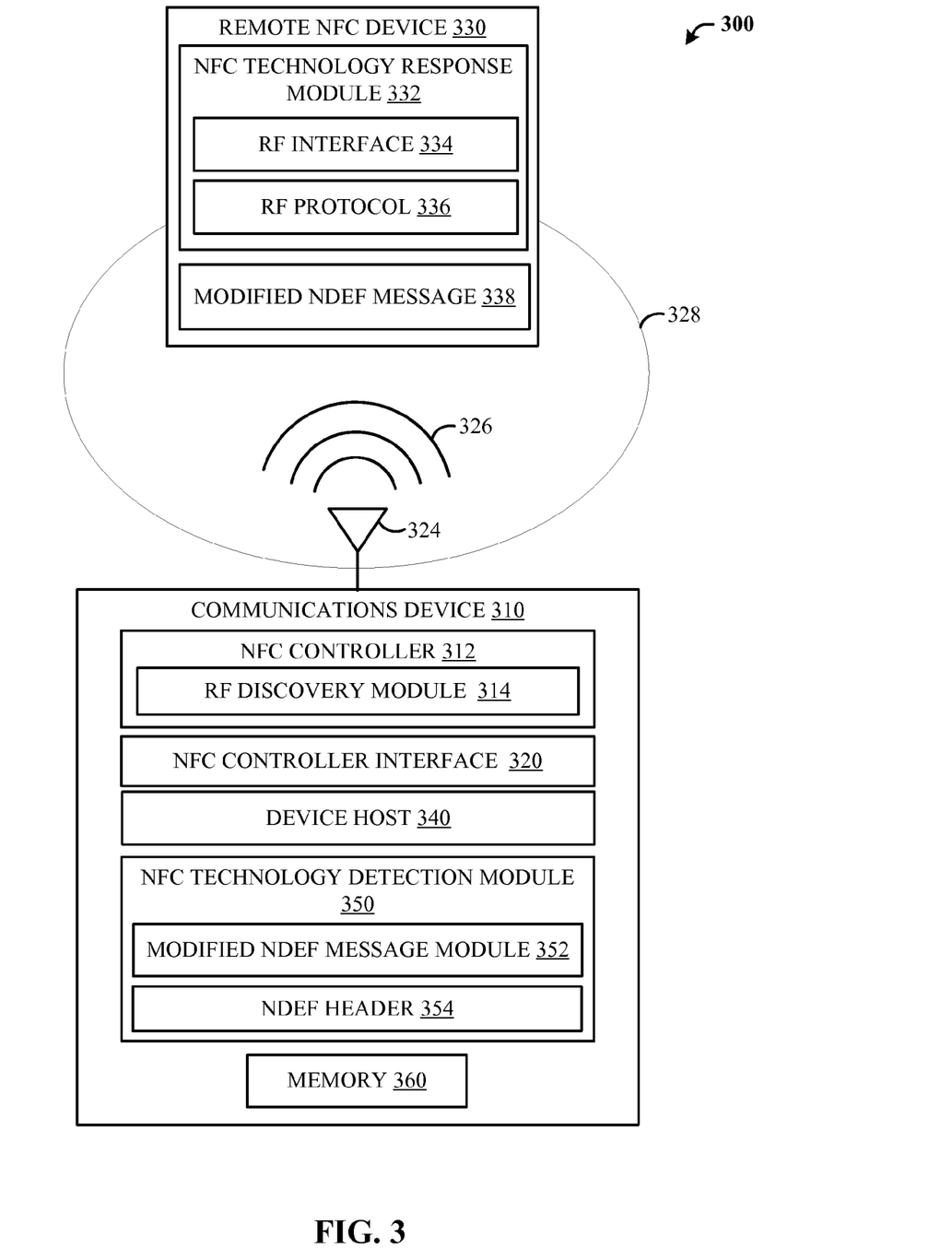
FIG. 3 is a block diagram of a NFC environment, according to an aspect.

With reference to FIG. 3, a block diagram of a communication network 300 according to an aspect is illustrated. Communication network 300 may include a communications device 310 which, through antenna 324, may be within an operating volume 328 of a remote NFC device 330. Communications device 310 may use one or more NFC RF technologies 326 (e.g., NFC-A, NFC-B, NFC-F, etc.). In an aspect, communications device 310 may use NFC technology detection module 350 to poll the operating volume 328 to attempt to detect the presence of and identify a remote NFC device 330. In an aspect, a remote NFC device (e.g., a tag, a reader, etc.) may be configured to communicate a data using modified NDEF message 338. In such an aspect, the modified NDEF message 338 may include data while omitting a NDEF header. The remote NFC device may communicate the modified NDEF message using NFC technology response module 332 through one or more RF interfaces 334 using one or more RF protocols 336. In an aspect, the remote NFC device may be configurable to use a NFC-A RF technology when transmitting the modified NDEF message. In another aspect, communications device 310 may be configurable to be connected to an access network and/or core network (e.g., a CDMA network, a GPRS network, a UMTS network, and other types of wireline and wireless communication networks). In an aspect, remote NFC device 330 may include but are not limited to a tag, a reader/writer device, a peer initiator device, a remote peer target device, etc.

Communications device 310 may include NCI 320. In an aspect, NCI 320 may be configurable to enable communications between a device host (DH) 340 and NFC controller 312.

Communications device 310 may include a NFC controller (NFCC) 312. In an aspect, NFCC 312 may include RF discovery module 314. RF discovery module 314 may be configurable to perform RF discovery using a discovery process. One aspect of the discovery process may include polling for the presence of a remote NFC device configurable to communicate using a NFC-A RF technology. DH 340 may be configurable to generate a command to prompt NFCC 312 to perform various functions associated with RF discovery.

Communications device 310 may include NFC technology detection module 350. NFC technology detection module 350 may be configurable to detect the presence of and/or receive data from a remote NFC device 330 within the operating volume 328. In an aspect, the remote NFC device 330 may send a modified NDEF message (e.g., data without an NDEF header). In an aspect, in which the remote NFC device 330 is a TTF device, the NFC technology detection module 350 may receive the modified NDEF message 338 upon initiation of an unmodulated RF field. NFC technology detection module 350 may further include modified NDEF message module 352 that may be configured to analyze the received modified NDEF message 338. In an aspect, modified NDEF message module 352 may infer contextual information from various sources to assist with processing received data. In an aspect, the contextual information may be associated with remote NFC device 330, the received data, and/or the modified NDEF message 338. In another aspect, the modified NDEF message module 352 may obtain contextual information from one or more sensors associated with the communications device 310. Such contextual information may include, but is not limited to, location information associated with the communications device 310, time of day information, day of a week information, date information, NFC technology type used to obtain the data, a bit rate of the data, an amount of data available from the remote NFC device 330, a prior communication with the remote NFC device 330, analysis of an order of communications (e.g., which device modulated an RF field first) between the remote NFC device 330 and the communications device 310, analysis of a portion of the data, etc. In an aspect, based at least in part of analysis of the contextual information, modified NDEF message module 352 may determine that received data is in a modified NDEF message 338 and may apply a NDEF header 354 to the modified NDEF message to generate a complete NDEF message. In such an aspect, the complete NDEF message may be communicated to an application of interest for processing. In an aspect, the NDEF header 354 may be a 3 byte header. In another aspect, where an application provides a data to be transmitted to a remote NFC device 330 in a complete NDEF message format, modified NDEF message module may determine, at least in part based on the obtained contextual information, that the remote NFC device 330 is configured to receive a modified NDEF message 338. In such an aspect, modified NDEF message module 352 may modify the complete NDEF message by removing at least a portion of the NDEF header 354 prior to communicating the data to the remote NFC device 330. Although FIG. 3 depicts NFC technology detection module 350 is a separate module, one of ordinary skill in the art would appreciate that the functionality associated with NFC technology detection module 350 may be included within one or more components, such as but not limited to, NFCC 312, DH 340, etc.

Communications device 310 may include further include memory 360 that may be configurable to store received data and/or at least a portion of a NDEF header that may be applied to a modified NDEF message to generate a complete NDEF message for processing by one or more applications associated with the communications device 310.

Accordingly, a system and method is disclosed to reduce overhead requirements for NDEF based messaging.

Figure 4:
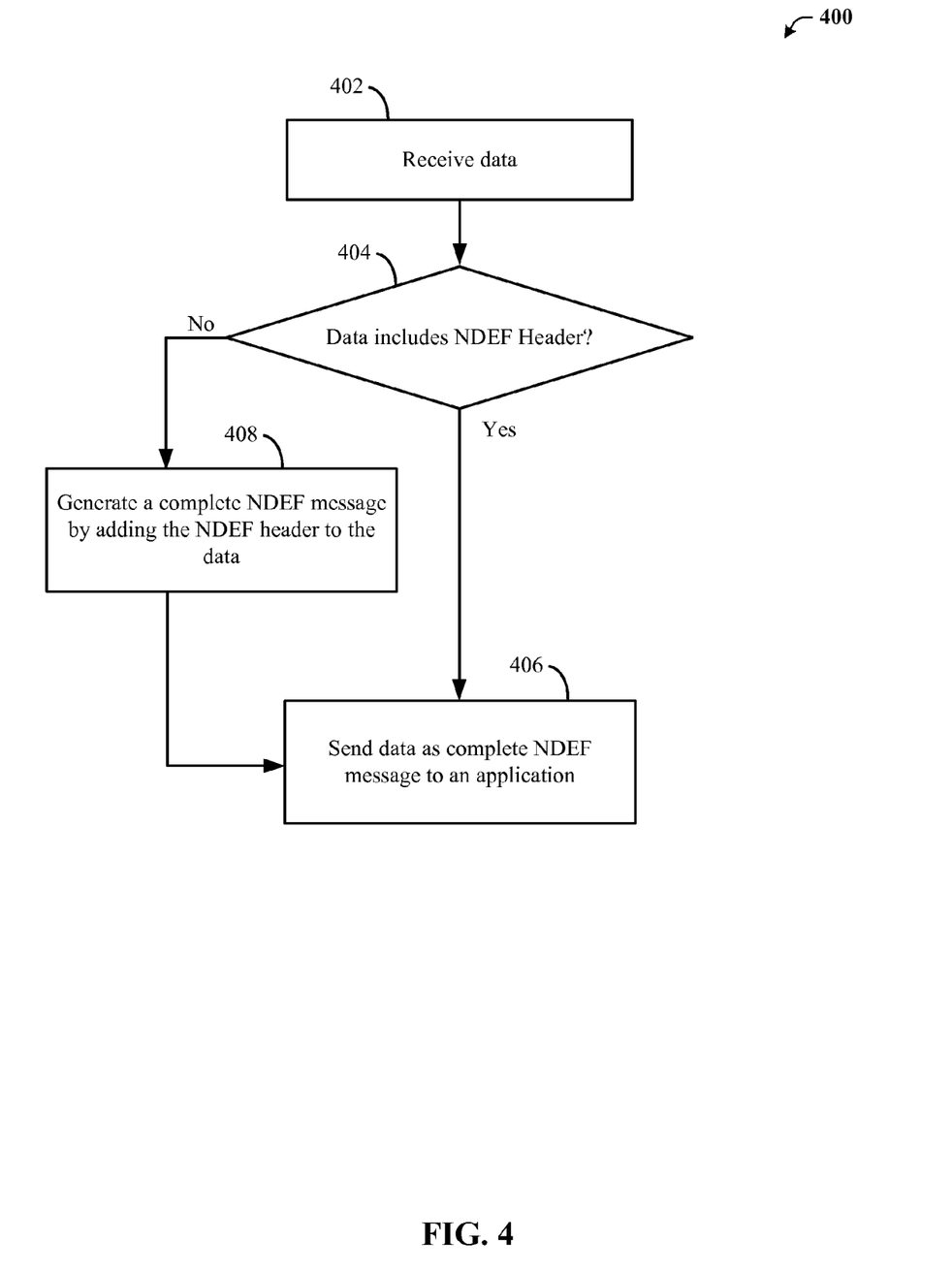
FIG. 4 is a flowchart describing an example for processing data that lacks a NDEF header, according to an aspect.
Figure 5:
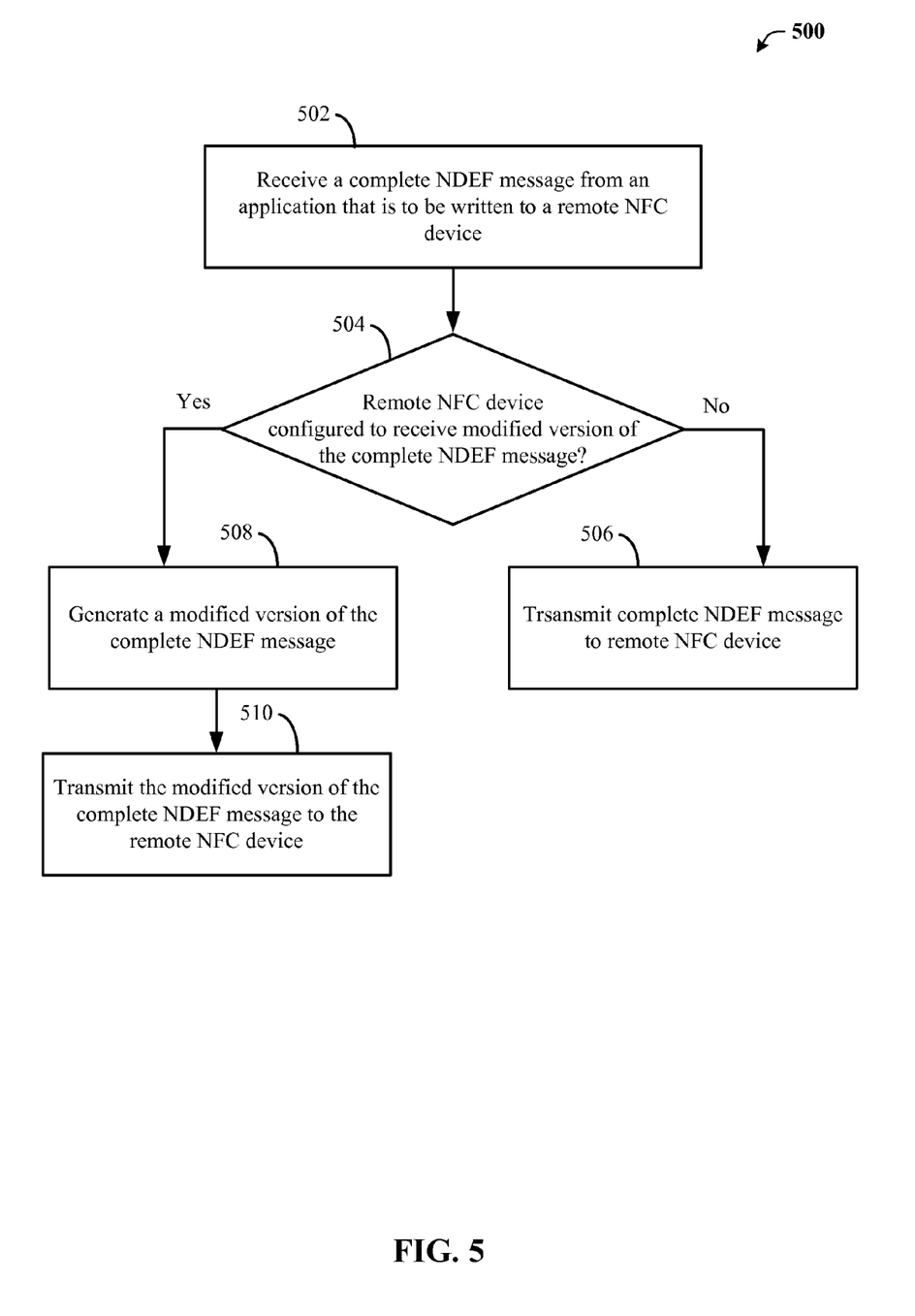
FIG. 5 is a flowchart describing another example for processing data that lacks a NDEF header, according to an aspect.

FIGS. 4-5 illustrate various methodologies in accordance with various aspects of the presented subject matter. While, for purposes of simplicity of explanation, the methodologies are shown and described as a series of acts or sequence steps, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 4 depicts an example flowchart describing a process 400 for processing NDEF based messaging with reduced overhead.

At block 402, a NFC device may receive data from a remote NFC device. In an aspect, the data may be received in response to a command transmitted from the NFC device. In another aspect, the data may be received from a TTF device that has responded to the presence of an unmodulated RF field. In an aspect, the data may be received from a remote NFC device that is configurable to use NFC-A radio RF technology. In another aspect, remote NFC device may include any combination of a tag, a card, and a peer device, etc.

At block 404, the NFC device may determine whether the data includes a NDEF header (e.g., if the received data is a complete NDEF message or a modified NDEF message). In an aspect, the NFC device may make the determination based at least in part on various contextual factors. In such an aspect, the contextual factors (e.g., contextual information) may include, but is not limited to, location information associated with the NFC device, time of day information, day of a week information, date information, NFC technology type used to obtain the data, a bit rate of the data, an amount of data available from the remote NFC device, a prior communication with the remote NFC device, analysis of an order of communications (e.g., which device modulated an RF field first) between the remote NFC device and the NFC device, analysis of a portion of the data, user interaction (e.g., user opening an application), etc.

If at block 404, the NFC device determines that the received data is formatted with a NDEF header (e.g., is a complete NDEF message), then at block 406, the NFC device may send the complete NDEF message to one or more applications for processing.

By contrast, if at block 404, the NFC device determines that the received data is in a modified NDEF message format (e.g., lacking at least a portion of the NDEF header), then at block 408, the NFC device may generate a complete NDEF message by adding any omitted portion of the NDEF header to the received data. In an aspect, the NDEF header may be a 3 byte header. For example, where a tag only has sufficient storage capability to storage the data and a reference (e.g., pointer) to a NDEF header, then the NFC device may analysis the pointer any apply the referenced NDEF header to the data. In another aspect, contextual information may be used to assist the NFC device in determining which parameters to include in a generated NDEF header. Thereafter, at block 406, the NFC device may send the complete message to one or more applications of interest.

FIG. 5 depicts an example flowchart describing another process 500 processing NDEF based messaging with reduced overhead.

At block 502, a NFC device may receive a complete NDEF message from an application to be transmitted to a remote NFC device. In such an aspect, the complete NDEF message may include an NDEF header and data. In an aspect, remote NFC device may include any combination of a tag, a card, and a peer device, etc.

At block 504, the NFC device may determine whether the remote NFC device is configured to receive a modified version of the complete NDEF message. In an aspect, the modified version of the NDEF message may include the data with the NDEF header omitted or in an abridged form. In an aspect, the NFC device may make the determination based at least in part on various contextual factors. In such an aspect, the contextual factors (e.g., contextual information) may include, but is not limited to, location information associated with the NFC device, time of day information, day of a week information, date information, NFC technology type used to obtain the data, a bit rate of the data, an amount of data available from the remote NFC device, a prior communication with the remote NFC device, analysis of an order of communications (e.g., which device modulated an RF field first) between the remote NFC device and the NFC device, analysis of a portion of the data, etc.

If at block 504, the NFC device determines that the remote NFC device is not configured to receive and/or is not expecting to receive a modified version of the complete NDEF message, then at block 506, the NFC device may transmit the complete NDEF message to the remote NFC device.

By contrast, if at block 504, the NFC device determines that the remote NFC device is configured to receive and/or is expecting to receive a modified version of the complete NDEF message, then at block 508, the NFC device may modify the complete NDEF message to generate the modified version of the complete NDEF message. In an aspect, the modification may include removal of at least a portion of the NDEF header.

At block 510, the NFC device may transmit the modified version of the complete NDEF message to the remote NFC device.

Figure 6:
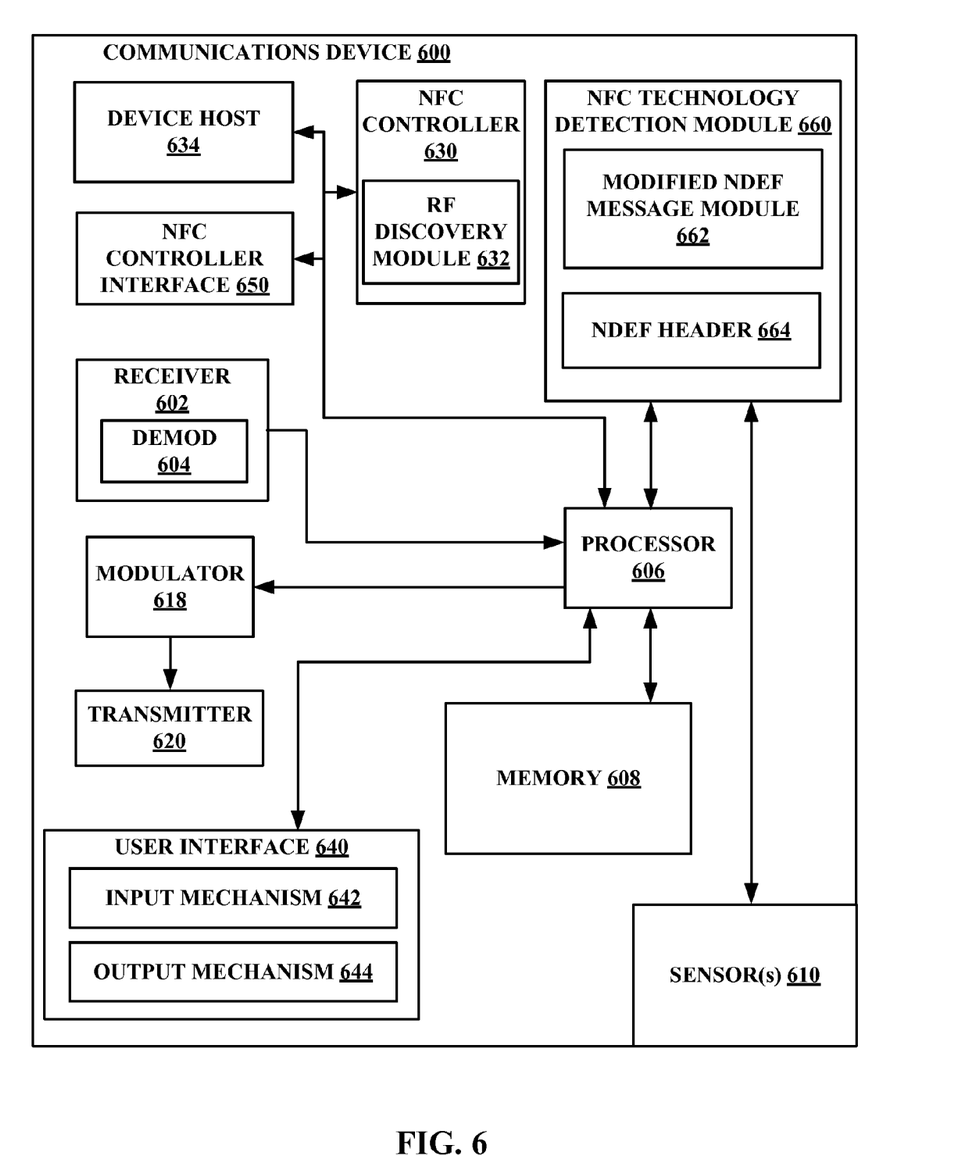
FIG. 6 is a block diagram example architecture of a communications device, according to an aspect.

While referencing FIG. 3, but turning also now to FIG. 6, an example architecture of communications device 600 is illustrated. As depicted in FIG. 6, communications device 600 comprises receiver 602 that receives a signal from, for instance, a receive antenna (not shown), performs typical actions on (e.g., filters, amplifies, downconverts, etc.) the received signal, and digitizes the conditioned signal to obtain samples. Receiver 602 can comprise a demodulator 604 that can demodulate received symbols and provide them to processor 606 for channel estimation. Processor 606 can be a processor dedicated to analyzing information received by receiver 602 and/or generating information for transmission by transmitter 620, a processor that controls one or more components of communications device 600, and/or a processor that both analyzes information received by receiver 602, generates information for transmission by transmitter 620, and controls one or more components of communications device 600. Further, signals may be prepared for transmission by transmitter 620 through modulator 618 which may modulate the signals processed by processor 606.

Communications device 600 can additionally comprise memory 608 that is operatively coupled to various components, such as but not limited processor 606 and that can store data to be transmitted, received data, information related to available channels, TCP flows, data associated with analyzed signal and/or interference strength, information related to an assigned channel, power, rate, or the like, and any other suitable information for assisting in NFC based communications.

Further, processor 606, device host 634, NFCC 630, and/or NFC technology detection module 660 can provide means for determining, based on one or more contextual factors, that data received at communications device 600 is missing at least a portion of a NDEF header 664, and means for generating a complete NDEF message by adding the at least the portion of the NDEF header 664 that is missing to the data. In another aspect, processor 606, device host 634, NFCC 630, and/or NFC technology detection module 660 can provide means for receiving, from a writer application, a complete NDEF message that includes a NDEF header 664 and data and is intended to be written on a remote NFC device 330, means for determining, based on one or more contextual factors, that the remote NFC device is configured to receive a modified version of the complete NDEF message, and means for generating the modified version of the complete NDEF message by removing at least a portion of the NDEF header 664 from the complete NDEF message.

It will be appreciated that data store (e.g., memory 608) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory 608 of the subject systems and methods may comprise, without being limited to, these and any other suitable types of memory.

Communications device 600 may include a NFC controller 630 and device host 634. In an aspect, NFCC 630 may include RF discovery module 632. RF discovery module 632 may be configurable to perform a discovery process. One aspect of the discovery process may include polling for the presence of one or more remote NFC devices. DH 634 may be configurable to generate a command to prompt NFCC 630 to perform various functions associated with RF discovery.

In another aspect, communications device 600 may include NCI 650. In an aspect, NCI 650 may be configurable to enable communications between a NFC controller 630 and DH 634. NCI 650 may be configurable to function in a listening mode and/or a polling mode.

In another aspect, communications device 600 may include NFC technology detection module 660. NFC technology detection module 660 may be configurable to detect the presence of and/or receive data from a remote NFC device within the operating volume. In an aspect, the remote NFC device may send a modified NDEF message (e.g., data without a NDEF header 664). In an aspect, in which the remote NFC device is a TTF device, the NFC technology detection module 660 may receive the modified NDEF message upon initiation of an unmodulated RF field. NFC technology detection module 660 may further include modified NDEF message module 662 that may be configured to analyze the received modified NDEF message. In an aspect, modified NDEF message module 662 may infer contextual information from various sources to assist with processing received data. In an aspect, the contextual information may be associated with remote NFC device, the received data, and/or the modified NDEF message. In another aspect, the modified NDEF message module 662 may obtain contextual information from one or more sensors 610 associated with the communications device 600. Such contextual information may include, but is not limited to, location information associated with the communications device 600, time of day information, day of a week information, date information, NFC technology type used to obtain the data, a bit rate of the data, an amount of data available from the remote NFC device, a prior communication with the remote NFC device, analysis of an order of communications (e.g., which device modulated an RF field first) between the remote NFC device and the communications device 600, analysis of a portion of the data, user interaction, etc. An example of user interaction may include where a user selects an application that is intended for the processing of TTF NFC devices. In an aspect, based at least in part of analysis of the contextual information, modified NDEF message module 662 may determine that received data is in a modified NDEF message and may apply a NDEF header 664 to the modified NDEF message to generate a complete NDEF message. In such an aspect, the complete NDEF message may be communicated to an application of interest for processing. In an aspect, the NDEF header 664 may be a 3 byte header. In another aspect, where an application provides a data to be transmitted to a remote NFC device in a complete NDEF message format, modified NDEF message module 662 may determine, at least in part based on the obtained contextual information, that the remote NFC device is configured to receive a modified NDEF message. In such an aspect, modified NDEF message module 662 may modify the complete NDEF message by removing at least a portion of the NDEF header 664 prior to communicating the data to the remote NFC device.

In another aspect, modified NDEF message module 662 may infer contextual information from various sources to assist in determining some or all of the parameters that can be included in the NDEF header 664. For example, one parameter that may be included in a NDEF header 664 is a "Type Name" which helps an application understand what to do with a message. In an aspect, based on obtained contextual information, modified NDEF message module 662 may infer a "Type Name" to be included in a generated NDEF header 664.

Although FIG. 6 detects NFC technology detection module 660 is a separate module, one of ordinary skill in the art would appreciate that the functionality associated with NFC technology detection module 660 may be included within one or more components, such as but not limited to, NFCC 630, DH 634, etc. In another aspect, NFC technology detection module 660 configurable to process NDEF based messages as described with respect to FIGS. 4-5.

Figure 7:
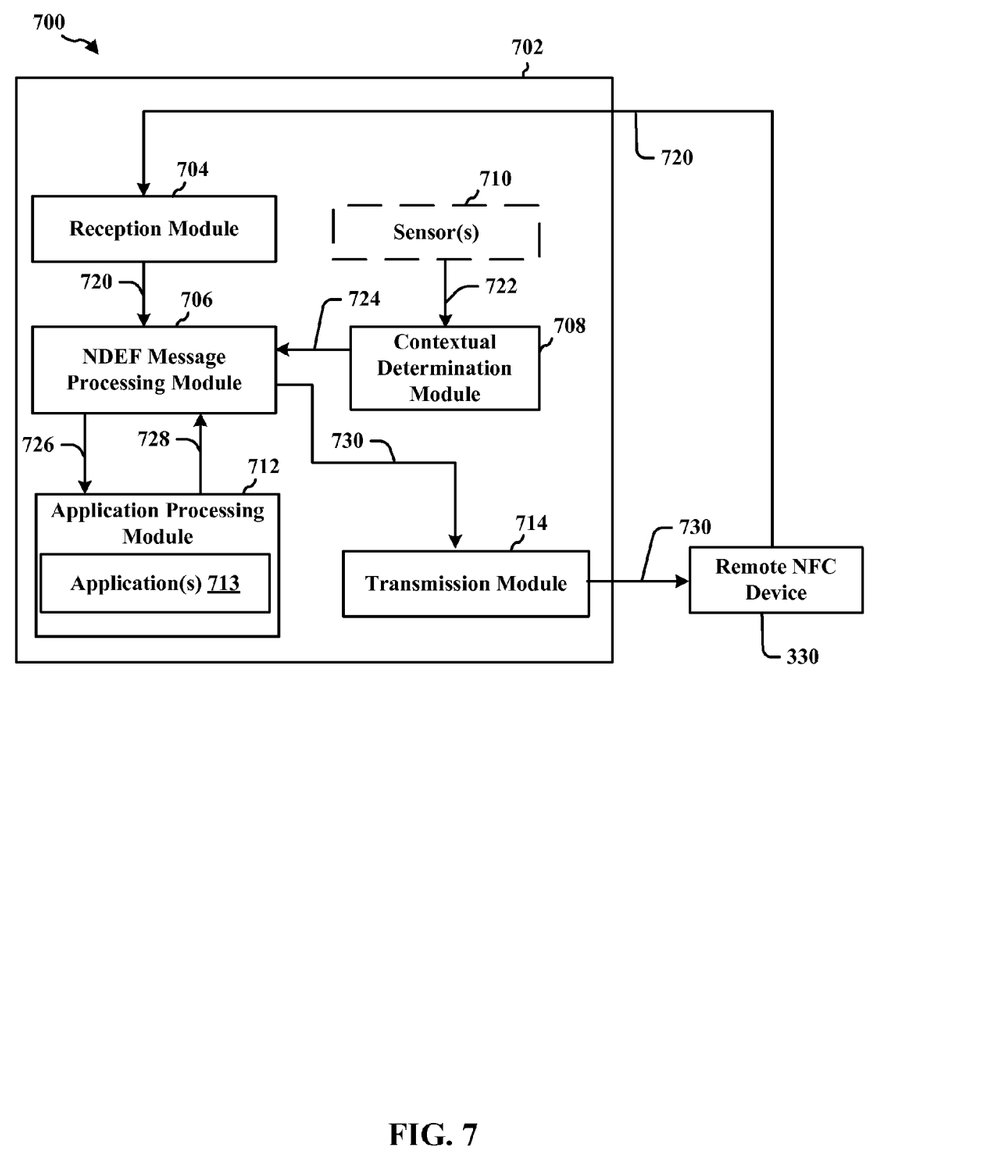
FIG. 7 is a conceptual data flow diagram illustrating the data flow between different modules/means/components in an example apparatus.

Additionally, communications device 600 may include user interface 640. User interface 640 may include input mechanisms 642 for generating inputs into communications device 600, and output mechanism 644 for generating information for consumption by the user of the communications device 600. For example, input mechanism 642 may include a mechanism such as a key or keyboard, a mouse, a touchscreen display, a microphone, etc. Further, for example, output mechanism 644 may include a display, an audio speaker, a haptic feedback mechanism, a Personal Area Network (PAN) transceiver etc. In the illustrated aspects, the output mechanism 644 may include a display configurable to present media content that is in image or video format or an audio speaker to present media content that is in an audio format. In an operational aspect, output mechanism 644 may provide a user with a message and/or prompt indicating that the complete NDEF message is not supported (e.g., does not fit) on the remote NFC device, and may ask the user if he or she would like to store the data without a NDEF header FIG. 7 is a conceptual data flow diagram 700 illustrating the data flow between different modules/means/components in an exemplary apparatus 702. The apparatus may be a wireless device (e.g., communications device 600, etc.). The apparatus includes a reception module 704, a NDEF message processing module 706, a contextual determination module 708, an application processing module 712, and a transmission module 714. In an optional aspect, apparatus 702 may also include one or more sensors 710.

In an operational aspect, apparatus 702 (e.g., communications device 600) may receive, through reception module 704, a NDEF message 720 from a remote NFC device 330. Reception module 704 may relay the NDEF message 720 to NDEF message processing module 706. NDEF message processing module 706 may also receive an indication 724 from contextual determination module 708 that the received NDEF message 720 may lack at least a portion of an NDEF header. In an aspect, contextual determination module 708 may send the indication 724 based on one or more contextual factors 722. In such an aspect, contextual determination module 708 may receive one or more of the contextual factors 722 from one or more sensors 710. Based on the indication 724, NDEF message processing module 706 may add the missing NDEF header (or the portion of the NDEF header that the message is lacking) to the received NDEF message 720 to generate a complete NDEF message 726, which may be sent to application processing module 712 and one or more applications 713.

In another operational aspect, an application 713 (e.g., a writer application) associated with application processing module 712 may send a complete NDEF message 728, intended for a remote NFC device 330) to NDEF message processing module 706. In an aspect, the complete NDEF message 728 includes a NDEF header and data. NDEF message processing module 706 may also receive an indication 724 from contextual determination module 708 that the remote NFC device 330 is configured to receive a modified version of the complete NDEF message 728. In an aspect, contextual determination module 708 may send the indication 724 based on one or more contextual factors 722. In such an aspect, contextual determination module 708 may receive one or more of the contextual factors 722 from one or more sensors 710. Based on the indication 724, NDEF message processing module 706 may modify the complete NDEF message 728 by removing the NDEF header (or a portion of the NDEF header) to generate a modified NDEF message 730, which may be send to transmission module 714 for transmission to the remote NFC device 330.

The apparatus may include additional modules that perform each of the steps of the algorithm in the aforementioned call flows and/or flow chart of FIGS. 4 and 5. As such, each step in the aforementioned FIGS. 4 and 5 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 8:
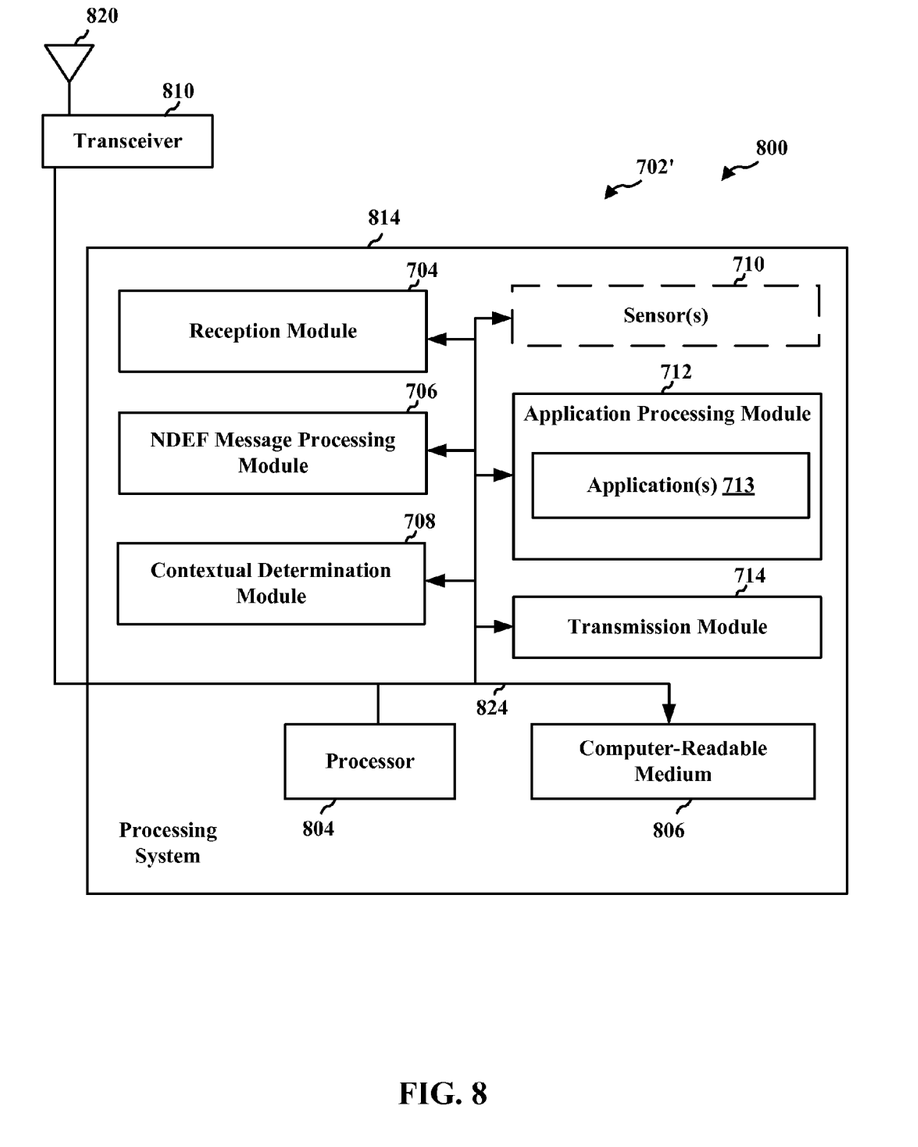
FIG. 8 is a diagram illustrating an example of a hardware implementation for an apparatus employing a processing system.

FIG. 8 is a diagram 800 illustrating an example of a hardware implementation for an apparatus 702' employing a processing system 814. The processing system 814 may be implemented with a bus architecture, represented generally by the bus 824. The bus 824 may include any number of interconnecting buses and bridges depending on the specific application of the processing system 814 and the overall design constraints. The bus 824 links together various circuits including one or more processors and/or hardware modules, represented by the processor 804, the modules 704, 706, 708, 710, 712, 714, and the computer-readable medium 806. The bus 824 may also link various other circuits such as timing sources, peripherals, voltage regulators, and power management circuits, which are well known in the art, and therefore, will not be described any further.

The processing system 814 may be coupled to a transceiver 810. The transceiver 810 is coupled to one or more antennas 820. The transceiver 810 provides a means for communicating with various other apparatus over a transmission medium. The processing system 814 includes a processor 804 coupled to a computer-readable medium 806. The processor 804 is responsible for general processing, including the execution of software stored on the computer-readable medium 806. The software, when executed by the processor 804, causes the processing system 814 to perform the various functions described supra for any particular apparatus. The computer-readable medium 806 may also be used for storing data that is manipulated by the processor 804 when executing software. The processing system further includes at least one of the modules 704, 706, 708, 710, 712, and 714. The modules may be software modules running in the processor 804, resident/stored in the computer-readable medium 806, one or more hardware modules coupled to the processor 804, or some combination thereof. In an aspect, the processing system 814 may be a component of the communications device 600 and may include the memory 608 and/or at least one of the processor 606, device host 634, NFC controller 630, and NFC technology detection module.

In one configuration, the apparatus 702/702' for wireless communication includes means for determining, based on one or more contextual factors, that data received at a NFC device is missing at least a portion of a NDEF header, and means for generating a complete NDEF message by adding the at least the portion of the NDEF header that is missing to the data. In an aspect, apparatus 702/702' may further include means for receiving the data from a remote NFC device. In an aspect, apparatus 702/702' may further include means for sending the complete NDEF message to an application.

In another configuration, the apparatus 702/702' for wireless communication includes means for receiving, from a writer application, a complete NDEF message that includes a NDEF header and data and is intended to be written on a remote NFC device, means for determining, based on one or more contextual factors, that the remote NFC device is configured to receive a modified version of the complete NDEF message, and means for generating the modified version of the complete NDEF message by removing at least a portion of the NDEF header from the complete NDEF message. In an aspect, apparatus 702/702' may further include means for transmitting the modified version of the complete NDEF message to the remote NFC device. In an aspect, apparatus 702/702' means for generating may be further configured to remove at least a portion of a NDEF header from the complete NDEF message.

As described supra, the processing system 814 may include the processor 606, device host 634, NFC Controller 630 and/or NFC technology detection module 660. As such, in one configuration, the aforementioned means may be the processor 606, device host 634, NFC Controller 630 and/or NFC technology detection module 660 configured to perform the functions recited by the aforementioned means.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, mobile equipment (ME), remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH, near-field communications (NFC-A, NFC-B, NFC,-f, etc.), and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules configurable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An example storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or aspects, it should be noted that various changes and modifications could be made herein without departing from the scope of the described aspects and/or aspects as defined by the appended claims. Furthermore, although elements of the described aspects and/or aspects may be described or claimed in the singular, the plural is contemplated unless limitation to the singular is explicitly stated. Additionally, all or a portion of any aspect and/or aspect may be utilized with all or a portion of any other aspect and/or aspect, unless stated otherwise.

What is claimed is:

1. A method of communications, comprising:
    determining, based on one or more contextual factors, that data received at a near field communication (NFC) device is missing at least a portion of a NFC data exchange format (NDEF) header; and
    generating a complete NDEF message by adding the at least the portion of the NDEF header that is missing to the data.

2. The method of claim 1, further comprising:
    receiving the data from a remote NFC device.

3. The method of claim 2, wherein the remote NFC device comprises a tag, a card, or a peer device.

4. The method of claim 1, further comprising:
    sending the complete NDEF message to an application.

5. The method of claim 1, wherein the one or more contextual factors include at least one of:
    location information associated with the NFC device;
    time of day information;
    day of a week information;
    date information;
    NFC technology type used to obtain the data;
    a bit rate of the data;
    an amount of data available;
    a prior communication with a remote NFC device;
    analysis of an order of communications between the remote NFC device and the NFC device;
    one or more user interactions; or
    analysis of a portion of the data.

6. The method of claim 5, wherein at least one parameter included in the NDEF header is determined based on the one or more contextual factors.

7. A non-transitory computer-readable medium comprising code for:
    determining, based on one or more contextual factors, that data received at a near field communication (NFC) device is missing at least a portion of a NFC data exchange format (NDEF) header; and
    generating a complete NDEF message by adding the at least the portion of the NDEF header that is missing to the data.

8. The non-transitory computer-readable medium of claim 7, further comprising code for:
    receiving the data from a remote NFC device.

9. The non-transitory computer-readable medium of claim 8, wherein the remote NFC device comprises a tag, a card, or a peer device.

10. The non-transitory computer-readable medium of claim 7, further comprising code for:
    sending the complete NDEF message to an application.

11. The non-transitory computer-readable medium of claim 7, wherein the one or more contextual factors include at least one of:
    location information associated with the NFC device;
    time of day information;
    day of a week information;
    date information;
    NFC technology type used to obtain the data;
    a bit rate of the data;
    an amount of data available;
    a prior communication with a remote NFC device;
    analysis of an order of communications between the remote NFC device and the NFC device;
    one or more user interactions; or
    analysis of a portion of the data.

12. The non-transitory computer-readable medium of claim 11, wherein at least one parameter included in the NDEF header is determined based on the one or more contextual factors.

13. An apparatus for communications, comprising:
    means for determining, based on one or more contextual factors, that data received at a near field communication (NFC) device is missing at least a portion of a NFC data exchange format (NDEF) header; and
    means for generating a complete NDEF message by adding the at least the portion of the NDEF header that is missing to the data.

14. The apparatus of claim 13, further comprising:
    means for receiving the data from a remote NFC device.

15. The apparatus of claim 14, wherein the remote NFC device comprises a tag, a card, or a peer device.

16. The apparatus of claim 13, further comprising:
    means for sending the complete NDEF message to an application.

17. The apparatus of claim 13, wherein the one or more contextual factors include at least one of:
    location information associated with the NFC device;
    time of day information;
    day of a week information;
    date information;
    NFC technology type used to obtain the data;
    a bit rate of the data;
    an amount of data available;
    a prior communication with a remote NFC device;
    analysis of an order of communications between the remote NFC device and the NFC device;
    one or more user interactions; or
    analysis of a portion of the data.

18. The apparatus of claim 17, wherein at least one parameter included in the NDEF header is determined based on the one or more contextual factors.

19. An apparatus for near field communication (NFC) communications, comprising:
    a transceiver configured to receive data;
    a memory;
    a processor coupled to the memory; and
    a NFC technology detection module coupled to at least one of the memory or the processor and configured to:
        determine, based on one or more contextual factors, that the data received at a near field communication (NFC)

device is missing at least a portion of a NFC data exchange format (NDEF) header; and generate a complete NDEF message by adding the at least the portion of the NDEF header that is missing to the data.

20. The apparatus of claim 19, wherein the NFC technology detection module is further configured to:

send the complete NDEF message to an application.

21. The apparatus of claim 19, wherein the one or more contextual factors include at least one of:

location information associated with the NFC device;
time of day information;
day of a week information;
date information;
NFC technology type used to obtain the data;
a bit rate of the data;
an amount of data available;
a prior communication with a remote NFC device;
analysis of an order of communications between the remote NFC device and the NFC device;
one or more user interactions; or
analysis of a portion of the data.

22. The apparatus of claim 21, wherein at least one parameter included in the NDEF header is determined based on the one or more contextual factors.

23. The apparatus of claim 19, wherein the data is received from a remote NFC device, and wherein the remote NFC device comprises a tag, a card, or a peer device.

* * * * *